United States Patent [19]

Taruntaev

[11] 3,899,909

[45] Aug. 19, 1975

[54] TOOL HEAD ASSEMBLY FOR IMPARTING ROTARY ROCKING MOTION TO A TOOL

[75] Inventor: Vladimir Taruntaev, Davison, Mich.

[73] Assignee: VSI Automation Assembly, Inc., Troy, Mich.

[22] Filed: June 17, 1974

[21] Appl. No.: 480,122

[52] U.S. Cl. .................. 72/112; 72/406; 29/243.53
[51] Int. Cl.² ......................................... B21J 15/12
[58] Field of Search ...................... 72/67, 112, 406; 29/243.53, 243.54; 173/94, 101

[56] References Cited
UNITED STATES PATENTS

| | | | |
|---|---|---|---|
| 3,595,324 | 7/1971 | Guild et al. | 173/101 |
| 3,675,461 | 7/1972 | Bernot | 72/406 |
| 3,703,823 | 11/1972 | Wilson | 72/406 |
| 3,762,199 | 10/1973 | Yoshikawa | 72/406 |
| 3,779,059 | 12/1973 | Mink | 72/406 |
| 3,800,579 | 4/1974 | Breiter | 29/243.53 |

Primary Examiner—Lowell A. Larson
Attorney, Agent, or Firm—McGlynn and Milton

[57] ABSTRACT

A tool head assembly including a drive member adapted for attachment to a rotatably driven member for rotation therewith about an axis, a tool support member, connecting means connecting the tool support member to the drive member on an axis at an angle to the first-named axis and means for preventing rotation of the tool support member with the drive member whereby rotation of the drive member imparts a rotary rocking motion to the tool support member, the tool support member including means for supporting at least two tool members.

In one preferred embodiment of the tool head assembly, the tool support member includes a bushing member rotatably supported by the tool support member, a bore extending through the bushing member adapted to receive a tool member wherein the axis of the bore is displaced from the axis of rotation of the bushing member, and means for selectively locking the bushing member against rotation whereby the position of the tool member with respect to the tool support member may be adjusted.

In another embodiment of the tool head assembly, the tool member includes a rounded head portion, a cap member disposed on the rounded head portion and pivotal relative thereto having a bearing surface for engaging the rounded head portion and a planar surface wherein the rounded head portion and cap member facilitate thrust transmission through the tool member.

58 Claims, 6 Drawing Figures

TOOL HEAD ASSEMBLY FOR IMPARTING ROTARY ROCKING MOTION TO A TOOL

This invention relates generally to a material deforming machine and is particularly adapted for forming heads on fasteners such as rivets, studs, tubes and the like. More specifically, the invention relates to a tool head assembly for imparting rotary rocking motion to one or more tool members and is primarily adapted to permit the use of multiple tool members.

By way of background, and referring to the fastener industry to exemplify the state-of-the-art, fastener heads were initially formed by means of a stamping operation. For example, the shank of a rivet is positioned in the aligned aperture of two parts to be fastened together. A sharp or sudden hammer blow is then applied to the exposed end of the shank, by means of a mechanically actuated hammer, to form a head. This process entails a number of disadvantages such as damage to the fastened parts, metallurgical problems in the rivet head due to rapid material deformation, and excessive noise. For these and other reasons, an improved process for forming rivet heads developed, such improved process being generally known as "orbital" or "spin" head forming.

In the orbital or spin forming process, a tool member, commonly referred to as a peen, is mounted in a rotating spindle at a slight angle, approximately 3°–8°, to the axis of rotation of the spindle. The peen is angled toward the axis of rotation and the length of the peen is such that the axis of rotation of the spindle and the center axis of the peen intersect on the working face of the peen. When the spindle is rotated, the working end of the peen demonstrates a revolving, wobbling motion about the intersection point generally referred to as a "rotary rocking motion". When a peen thus rotating is brought into contact with the free end of a rivet or the like and a constant pressure is applied, the end of the rivet is gradually deformed to form a rivet head. This process, therefore, eliminates substantially all of the undesirable features of the impact or stamping-type operation.

In recent years, the use of the orbital head forming process for forming heads on rivets and other types of fasteners has become quite extensive in manufacturing industries. One drawback associated with the orbital head forming machines heretofore employed is that a separate spindle was required for each peen. In other words, head forming was carried out primarily as a unit operation; that is, only one fastener could be operated upon at a time. Multiple spindle presses were developed for performing multiple fastening operations at a single station; however, each spindle head was capable of carrying only one peen. All of the fasteners of small parts having more than one fastener could not be operated upon simultaneously due to the space requirements of the multiple spindle arrangement. Therefore, it became desirable to provide a tool head assembly adapted for attachment to the spindle of a machine press capable of carrying more than one peen.

A multipeen head forming machine of this general type is shown in the U.S. patent to Berndt U.S. Pat. No. 3,675,461 issued July 11, 1972. In the machine disclosed, each one of a plurality of peens is mounted intermediate its ends in a support member and the upper end of the peens is moved in a circular path by means of a drive member which is driven to produce a translatory circular motion thereby imparting rotary rocking motion to the peens. This machine requires an elaborate arrangement of eccentric gearing to produce the desired motion of the peens and is, therefore, cumbersome and undesirable from a manufacturing standpoint.

The instant invention provides a tool head assembly for imparting rotary rocking motion to one or more tool members or peens which is more desirable from both the manufacturing and use standpoints than heretofore known devices. Accordingly, the tool head assembly of the instant invention includes a drive member adapted for attachment to a rotatably driven member, such as the spindle of a suitable machine press, for rotatable movement therewith and tool support means for supporting at least one tool member which is capable of operating at a point displaced from the axis of rotation of the spindle. It will become apparent that the tool support means is therefore capable of carrying more than one tool member. Connecting means is provided which rotatably connects the drive member to the tool support means wherein the connecting means is disposed in a plane nonperpendicular with respect to the axis of rotation of the drive member. Means is also provided for preventing rotation of the tool support means with the drive means whereby rotation of the drive member imparts rotary rocking motion to the tool support means. The tool support means includes means for axially, slidably supporting at least one tool member and is capable of supporting a number of tool members. In this fashion, rotary rocking motion can be imparted to multiple tool members carried by a single tool support member for operating on relatively closely-spaced fasteners.

The instant invention provides a tool head assembly which includes means for imparting rotary rocking motion to the working end of one or more tool members, and means for transmitting thrust through the tool members to a workpiece wherein a thrust transmitting means includes a cap member defining a bearing surface and a stress concentration reducing planar surface for preventing damage to elements of the tool head assembly.

The instant invention provides a tool head assembly including a rotatable bushing member for supporting a tool member in a bore which is offset from the center of the bushing member whereby the position of the tool member may be adjusted so that the tool head assembly is capable of operating on workpieces having differently located fasteners.

Other purposes and functions of the instant invention will be readily appreciated as the same becomes better understood by reference to the following detailed description when considered in connection with the accompanying drawings wherein.

Figure 1:
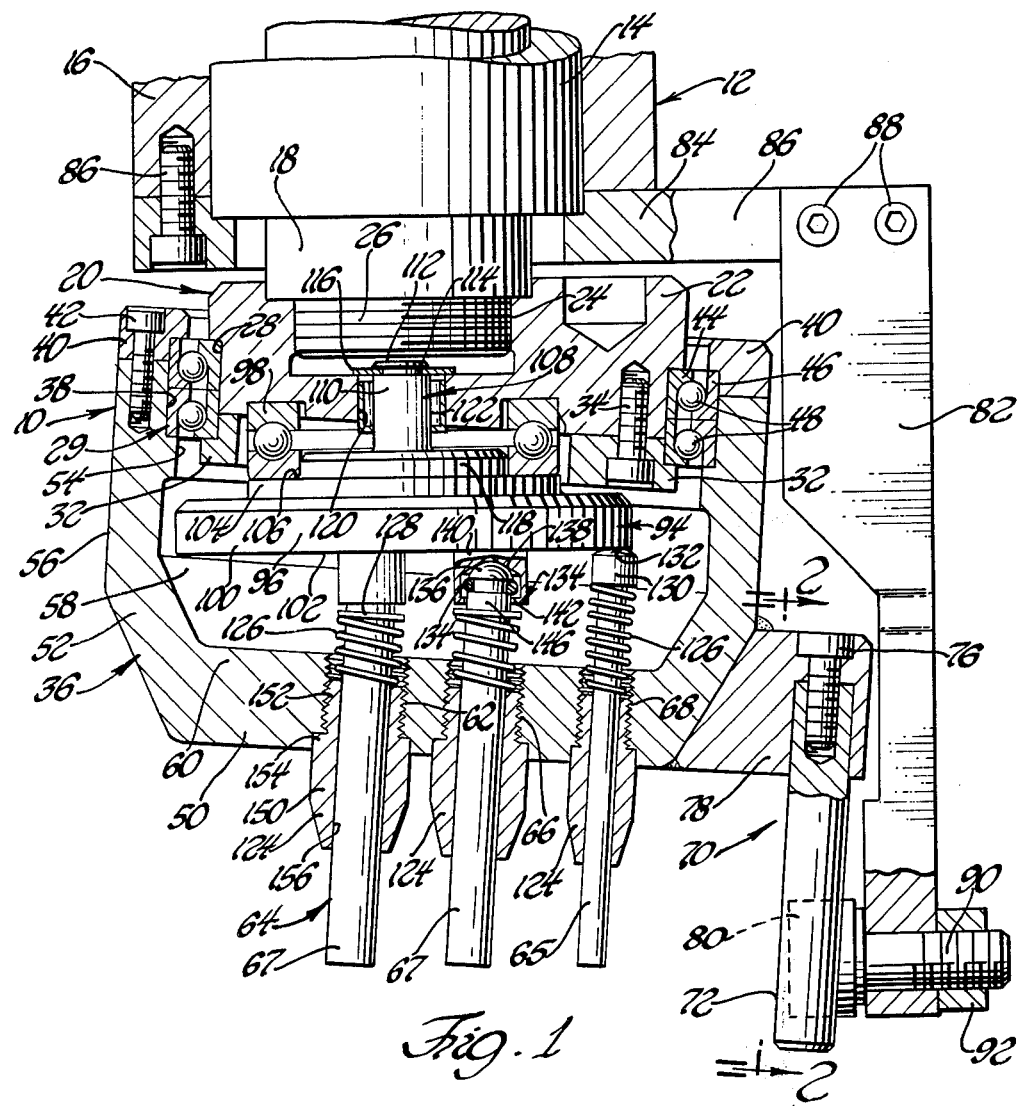
FIG. 1 is an elevational view substantially in cross section of a preferred embodiment of the instant invention.

Referring to the drawings, a tool head assembly for imparting a rotary rocking motion to one or more tool members is generally shown at 10. The tool head assembly 10 is adapted for attachment to an axially driven member, generally indicated at 12, for rotatable movement therewith. More specifically, the tool head assembly 10 is adapted for use with any suitable machine press which includes an axially movable head, such as a hydraulically-operated ram, which carries a rotatable spindle. Such machine presses are well known and, therefore, need not be described in greater detail. Suffice it to say, however, that the machine press includes suitable controls for controlling the axial movement of the head and the rotational movement of the spindle. By way of illustration, the working end or head of the machine press includes a quill 14 or hollow shaft enclosed in and movable with the axially movable housing 16 of the machine press. A suitably rotated spindle 18 is mounted within the quill 14 to provide a rotational drive for the tool head assembly 10. The axially movable head is adapted to bring the tool head assembly 10 into engagement with a workpiece located on a suitable work surface. Alternatively, the workpiece may be mounted on an axially movable fixture to move the workpiece into engagement with the tool head assembly.

The tool head assembly 10 is particularly adapted for imparting rotary rocking motion to a plurality of tool members, such as peens for example. In the preferred embodiment of the invention shown in the drawings, the tool head assembly 10 is suited for forming the heads on fasteners such as rivets and the like. It is noted, however, that the invention has equal application in other forming operations whenever it is desirable to produce a rotary rocking motion in the tool member.

The tool head assembly 10 includes drive means, generally indicated at 20, which is adapted for attachment to the rotatable spindle 18 of the axially movable head 12 for axial and rotatable movement therewith. More specifically, the drive means 20 comprises a circular drive member 22 including attaching means 24 for attaching the drive member 22 to the spindle 18 of the machine press. The attaching means 24 comprises an internally threaded bore which is offset from the center of the drive member 22 for receiving the threaded end 26 of the spindle 18.

The drive member 22 further includes an external annular portion 28 for supporting connecting means, comprising a bearing member, generally indicated at 29, such that the connecting means 29 is disposed in a plane nonperpendicular with respect to the axis of rotation of the drive member 22 and, consequently, the axis of rotation of the spindle 18. A bearing retainer member 32 is fastened to the lower end of the drive member 22 by means of fastening members, such as the threaded fastener 34, for retaining the bearing member 29 on the drive member 22.

Tool support means, generally indicated at 36, is rotatably connected to the drive member 22 by means of the bearing member 29. For this purpose, the tool support means 36 includes an internal annular portion 38 which encircles the bearing member 29. A bearing retainer member 40 is provided including fastening members, such as the threaded fastener 42, for maintaining the connection between the tool support means 36 and the bearing member 29. The bearing member 29 employed includes an inner race member 44 which is seated on the external annular portion 28 of the drive member 22, an outer race member 46 which is seated in the internal annular portion 38 of the tool support means 36 and a plurality of ball bearings 48 disposed between the race members 44 and 46 for providing a rotatable connection between the drive member 22 and the tool support means 36. It is noted that the connection means comprising, in this case, the bearing member 29 connects the tool support means 36 to the drive member 22 on an axis at an angle to the axis of rotation of the drive member 22. Due to this canted arrangement, rotation of the drive member 22 causes the tool support means 36 to wobble if rotation of the tool support means 36 with the drive member 22 is prevented.

The tool support means 36 further includes a tool support portion 50 lying in a plane parallel to the plane of the internal annular portion 38 and axially spaced therefrom for supporting one or more tool members. In other words, the tool support means 36 generally comprises a cup member 52 having an upper open end 54 defining the internal annular portion 38, a substantially cylindrical side wall portion 56 which connects the internal annular portion 38 to the tool support portion 50 and defines a cavity 58 within the cup member 52, and a bottom wall portion 60 defining the tool support portion 50. The bottom wall portion 50 includes at least one passageway 62 therethrough for axially, slidably supporting a tool member, generally indicated at 64, wherein the working end of the tool member may be offset laterally with respect to the axis of rotation of the tool support means 36. In the tool head assembly shown, two additional passageways 66 and 68 are included for axially, slidably supporting additional tool members 64. It is noted that the number of tool members shown is exemplary and that others may be added to the tool support means 36 in any position on the tool support portion 50. An important aspect of the invention is that a tool member may be mounted in a tool head without regard to the axis of rotation of the spindle as was the case in the original single tool heads described above.

The tool member 64 shown is commonly known as a peen and generally comprises a cylindrical shaft of steel. The tool member 64 has a flat working face; however, it is noted that tool members having shaped working faces, such as a concave or convex working surface, may also be used with the tool head assembly 10.

The tool head assembly 10 includes means, generally shown at 70, for preventing rotation of the tool support means 36 with the drive member 22. The means 70 includes two depending, spaced-apart, parallel rod members 72 and 74 which are supported laterally from the axis of rotation of the drive member 22. Specifically, the rod members 72 and 74 are attached at their upper ends by means of fastening members, such as the threaded fasteners 76, to an arm member 78 extending radially outwardly from the lower end of the cup member 52. A roller member 80 is disposed between the rod members 72 and 74 and is in rolling engagement therewith. The roller member 80 is rotatably supported by a support member 82 which is attached to a member nonrotatably fixed with respect to the drive member 22. In other words, the roller member 80 is supported in such a manner as to be anchored with respect to the housing member 16. Additionally, the roller member 80 is positioned for rotation about an axis perpendicular to the axis of rotation of the drive member 22.

Accordingly, a collar member 84 is attached to the housing member 16 of the machine press by means of fastening members, such as the threaded fasteners 86. The collar member 84 includes a radially extending extension 86 to which is attached the depending support member 82 by means of threaded fasteners 88. The roller member 80 is attached to the support member 82 by means of a threaded shaft 90 and nut 92. By this arrangement, rotation of the tool support means 36 is precluded when the drive member 22 is rotated. As stated above, the axis or rotation of the roller member 80 is perpendicular to the axis of rotation of the drive member 22. Since the rod members 72 and 74 not only have a vertical component of motion, as viewed in FIGS. 1–3, but also have a continuously changing angular relationship with respect to the vertical direction, the axis of the roller member 80 must be positioned at the center of motion to permit free movement of the rod members 72 and 74. For this reason, the axis of rotation of the roller member 80 intersects the point of intersection of the axis of rotation of the drive member 22 and the central axis of the tool support means 36.

Thrust transmitting means, generally indicated at 94, for transmitting thrust to the tool members 64 is supported within the cavity 58 in a plane perpendicular with respect to the axis of rotation of the drive member 22. The thrust transmitting means generally comprises a thrust plate member 96 supported by the drive member 22 and a thrust transmitting bearing 98 disposed between the drive member 22 and the thrust plate member 96. The thrust plate member 96 includes a tool engaging portion 100 consisting of an annular plate member having a planar, tool engaging bottom surface 102, a thrust receiving portion 104 consisting of a second annular plate member integral with the first annular plate member 100 and having a thrust receiving surface 106, and a support portion generally indicated at 108.

The thrust plate member 96 is rotatably supported by the drive member 22 such that the drive member 22 such that the drive member 22 may rotate relative to the thrust plate member 96. In other words, when the thrust plate member 96 is in thrust transmitting relationship with the tool members, it does not rotate. Accordingly, the support portion 108 includes a cylindrical support shaft 110 disposed in an axial bore 120 extending through the drive member 22 and connecting means 112 for connecting the support shaft 110 to the drive member 22. The connecting means 112 includes an annular groove 114 disposed in the support shaft 110 and a ring member 116 disposed in the annular groove wherein the transverse dimension of the ring member 116 is greater than the transverse dimension of the bore 120 and the support shaft 110. The support portion 108 further includes a third annular plate member 118 of smaller diameter than the second annular plate member 104 and integral withwith for locating the thrust transmitting bearing 98 and connecting the support shaft member 110 to the second annular member 104. A bearing member 122 is disposed within the bore 120 for further facilitating the rotatable connection between the drive member 22 and the thrust plate member 96. By the arrangement described, thrust or pressure developed by the ram of the machine press 10 can be effectively transferred through the drive member 22, thrust bearing 98, and thrust plate member 96 to the tool members 64.

Each of the tool members 64, which in the drawings comprise a cylindrical peen, is axially, slidably mounted in a bushing member 124 which is suitably fastened within the passageways 62, 66, 68 of the cup member 52. The upper or mounted ends of the tool members 64 extend into the cavity 58 of the cup member 52 and are in thrust transmitting engagement with the thrust plate member 96. To prevent the tool members 64 from sliding out of the bushing members 124, a coil spring member 126 is disposed about an upper end of the tool members 64 between the bushing member 124 and a snap ring 128 or, alternatively, an enlarged head 130 on the tool member 64. The coil spring member 126, therefore, not only keeps the tool member 64 within the bushing member 124, but also serves as means for urging the mounted end of the tool member 64 into engagement with the thrust plate member 96. Of course, the snap ring 128, or enlarged head 130, would keep the tool member 64 from sliding completely out of the bushing member 124; however, if the tool member 64 is permitted to drop downwardly and away from the thrust plate member 96 between operations, an excessive, sudden shock will be experienced by the workpiece when the tool head assembly 10 is again brought into engagement with the workpiece causing the thrust plate member 96 to strike the ends of the tool members. In short, it is desirable to maintain the mounted end of the tool member 64 in engagement with the thrust plate member 96 at all times, even when the tool member 64 is not in engagement with a workpiece. This function is accomplished by the coil spring member 126.

In operation, rotation of the drive member 22, by means of the spindle 18, imparts a rotary rocking motion to the tool support means 36 due to the canted bearing connection provided by the bearing means 29. As alluded to above, such motion is facilitated by preventing rotation of the tool support means 36 with the drive member 22 by the rod members 72 and 74 and fixed roller member 80. In fact, if some means were not provided for preventing rotation of the tool support means 36, and such rotation occurred, the tool head assembly would be unable to perform its intended operation on a fastener since the tool members 64, which are offset from the axis of rotation, would be traveling in a circular path. Since the tool members 64 are axially, slidably supported by the tool support means 36, the tool members 64 move in response to the motion of the tool support means 36. The length of each tool member 64 is such that the center of the working face thereof is disposed in a transverse plane which includes the point of intersection of the axis of rotation of the drive member 22 and the central axis of the tool support means 36. Accordingly, the working face of the tool member 64 demonstrates a rotary rocking motion about its center point similar to the motion of the tool support means 36.

As shown in FIG. 1, a plurality of tool members can be mounted in the tool head assembly 10 in relatively close relationship so that a plurality of fasteners on a workpiece may be operated upon simultaneously; that is, in a single operation. It is noted that the tool members 64 must be axially, slidably supported by the tool support means 36 to operate correctly. As is apparent, the vertical component of motion of the tool support means 36 as it wobbles or orbits increases in a direction radially outwardly from its center. If the tool member 64 is disposed at the exact center of the tool support means 36, such vertical motion would not be troublesome. It is inherent in the invention, however, that at least one tool member will be positioned away from the center of the tool support means 36 since only one tool member can occupy the center position. If the tool member positioned away from the center were fixed with respect to the tool support housing 36, it would be forced to move vertically up and down as viewed in FIG. 1. This, of course, is undesirable since the workpiece remains in a relatively stationary position. Therefore, since only rotary rocking motion or orbital motion is to be imparted to the tool member 64, it must be axially, slidably supported by the tool support means 36 so that the tool support means 36 is free to move vertically without carrying the tool member 64 with it.

The central axis of the the tool support means 36 is disposed at an angle with respect to the axis of rotation of the spindle 18 and drive member 22 due, of course, to the nonprependicular arrangement of the bearing member 29 on the drive member 22. This angle may be varied depending on the amount of rotary rocking motion required, but is normally between 3°–8°. The central axis of the tool support means 36 orbits about the axis of rotation at a fixed angle; that is, the orientation of the tool support means 36 changes as the drive member 22 is rotated. For example, as viewed in FIG. 1, the right side of the tool support meand 36 is tilted downwardly with respect to the axis of rotation while the left side is tilted upwardly. A rotation of the drive member 22 through 180° reverses these posistions so that the right side is tilted upwardly and the left side downwardly. Since the tool members 64 are supported by the tool support means 36, the center axis of each is also forced to orbit. The center axis of each tool member 64, rather than orbiting about the axis of rotation, orbits about an axis parallel to the axis of rotation which axis passes through the center point on the working face. Accordingly, the working face performs a rotary rocking motion.

In the tool head assembly 10, described above, it is important to recognize that the thrust plate member 96 will experience stress concentration at the points which engage the ends of the tool members 64. When a relatively small diameter tool member is used, such as the tool member 65 shown at the right in FIG. 1, for operating upon small, easily deformable workpieces, the amount of stress experienced by the thrust plate member 96 will normally not cause any problems. In such a case, it is only necessary to provide a crowned or rounded surface on the tool member 65 such as the rounded surface 132 on the enlarged head 130. The rounded surface 132 permits the tool member 65 to pivot freely with respect to the thrust plate member 96 as its central axis moves angularly relative to the plane of the thust plate member 96. As the size or hardness of the workpiece increases, thereby requiring a larger diameter tool member, such as the two tool members 67 shown at the left in FIG. 1, the amount of stress experienced by the thrust plate member 96 increases due to the greater amount of pressure required in the operation. Such high stress concentrations could cause cracking if only point contact is established between the thrust plate member 96 and the tool member as in the smaller tool member 65; therefore, using the rounded head 132 may cause problems. For this reason, the tool members 67, and specifically the mounted end thereof, includes means for reducing stress concentration by enlarging the contact area between the thrust plate member 96 and tool members 67. Such means includes a cap member, generally indicated at 134, which is disposed on a rounded head or hemispherical portion 136 of the tool member 67. The cap member 134 includes a conical bearing surface 138 for engaging the rounded head portion 136 and a planar surface 140 which engages the planar tool engaging surface 102 of the thrust plate member 96.

More specifically, the cap member 134 includes a hollow cylindrical body portion having an open end for receiving the rounded head portion 136 of the tool member 67 and a closed end. The interior side of the walls which closes the upper end of the cap member 134 defines the bearing surface 138, while the exterior side defines the planar surface 140. The planar surface 140 increases the area of contact between the thrust plate member 96 and the tool member 67 thereby eliminating point contact so that excessive stress concentration does not occur. Additionally, the bearing surface 138 which constitutes a seat for the rounded head portion 136 facilitates pivotal movement between the tool member 67 and the cap member 134.

Retaining means comprising a radially inwardly extending flange member 142 and a cooperating resilient O-ring member 144, seated in an annular groove 146 substantially adjacent the rounded head portion 136, is provided for retaining the cap member 134 on the tool member 67. The overall dimension of the O-ring 144 is greater than the size of the opening in the cap member 134 defined by the flange member 142 so that the O-ring 144 tends to maintain the cap member 134 in place. Since the O-ring 144 is made of a resiliently deformable material, such as rubber, the cap member 134 may be removed and replaced by the application of a sufficient force. As shown in FIG. 1, the snap ring member 128 for engaging the end of the coil spring member 126 is spaced from the cap member 134 a distance sufficient to allow pivotal movement of the cap member 134 with respect to the mounted end of the tool member 67.

As shown in FIG. 1, the bushing members 124 include a generally cylindrical body portion 150 having a reduced, externally threaded end 152 for engagement with the passageways 62, 66, or 68 which are provided with mating internal threads. The passageways 62, 66, and 68 may be suitably countersunk to receive the annular shoulder 154 of the body portion 150. The bushing member 124 includes a central axial bore 156 for axially, slidably receiving a tool member 67 or 65 having an outer diameter closely approximating the inner diameter of the bore 156. The section of the body portion 150 of the bushing members 124 which surrounds the tool member below the lower surface of the tool support means 36 increases the leverage on the tool member and provides an extended sliding surface. Additionally, the bushing members 124 provide a convenient means for removing and replacing worn tool members. In other words, should it become necessary to remove one of the tool members for any reason, such removal is accomplished by simply turning the bushing member 124 out of its passageway in the tool support means 36. The entire tool member can then be removed through the passageway since the cap member 134, in the case of the larger tool member 67, and the enlarged head 130, in the case of the smaller tool member 65, are smaller than their respective passageways.

Figure 6:
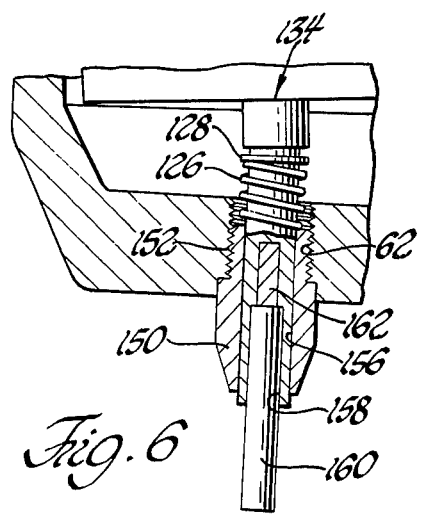
FIG. 6 is a broken-away, elevational and substantially in cross section of a further modification of the instant invention.

As shown in FIG. 6, a quick-change type of tool member 67' may be provided. In this case, the tool member 67' itself includes an axial bore 158 for receiving a separate working end 160 or tool bit. The tool member 67' is also provided with means 162 for removably retaining the working end 160 in the bore 158. Since, in most cases, the tool member and particularly the working end 160 is made of a magnetic material, such as tool steel or other ferrous-base metal, such means may comprise a permanent magnet imbedded in the bore 158. The permanent magnet serves to hold the end 160 in the bore 158; however, it is apparent that the end 160 can be removed by the application of a sufficient downward force.

Figures 2, 3:
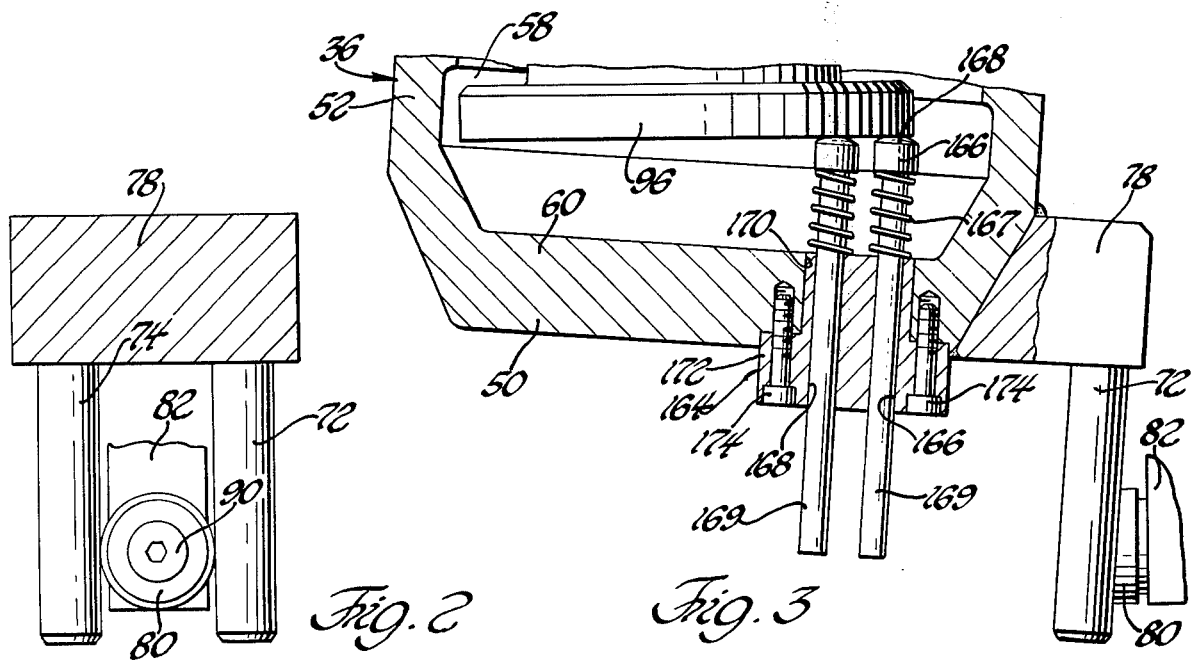
FIG. 2 is a side elevational view taken generally along line 2—2 of FIG. 1.
FIG. 3 is a broken-away, elevational view substantially in cross section of a modification of the instant invention.

On occasion, it is necesssary to position two or more of the tool members extremely close together, particularly when the workpiece is small and includes a number of small, closely spaced fasteners which must be operated upon simultaneously. Under these conditions, bushing members which carry only a single tool member, such as the bushing members 124 shown in FIG. 1, cannot be as closely spaced as is necessary. FIG. 3 shows a modification of the bushing design which allows close spacing of the tool members. Specifically, the bushing member 164 includes more than one bore; that is, for example, two bores 166 and 168; for axially, slidably receiving more than one tool member 169. The tool members 169 mounted in the bushing member 164 are similar in construction to the smaller tool member 65 in that they include an enlarged head 166 having a rounded portion 168 rather than a cap member. The smaller tool members are normally adequate since the fasteners used in the smaller workpieces can be formed with relatively low pressures and, therefore, the stress concentration reducing cap members 143 are not required. Each of the tool members 169 further include a coil spring member 167 which serve the same function as the coil spring members 126 on the other tool members, as described above.

The multiple tool bushing member 164 does not include a threaded portion as do the single tool bushing members 124 since the position of the tool members 169 must be accurately located. Due to the fact that the tool members 169 are not centrally located with respect to the axis of the bushing member 164, their positions with respect to the tool support means 36 changes as the bushing member 164 is rotated. Therefore, a threaded connection between the bushing member 164 and the passageway 170 is undesirable because it involves rotation of the bushing member 164 with no accurate control over the tightened position. Accordingly, the shoulder portion 172 of the bushing member 14 is secured to the tool support portion 50 by means of threaded fasteners 174 whereby a fixed position between the bushing member 164 and the tool support portion 50 may be established and permanently maintained.

Figure 4:
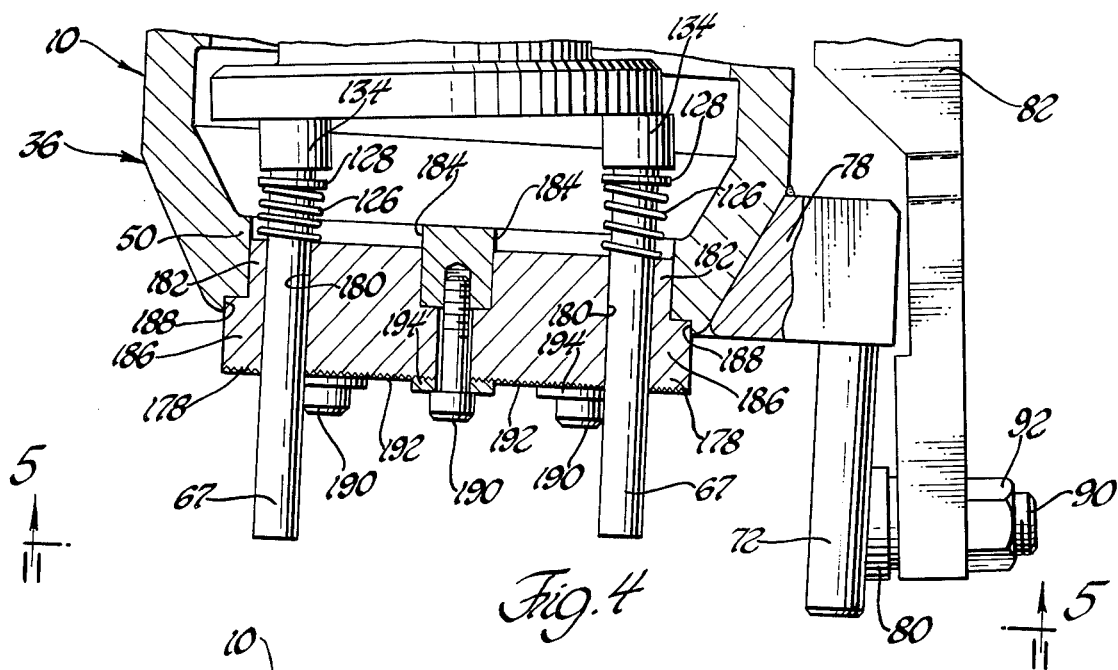
FIG. 4 is a broken-away, elevational view substantially in cross section showing an additional modification of the instant invention.
Figure 5:
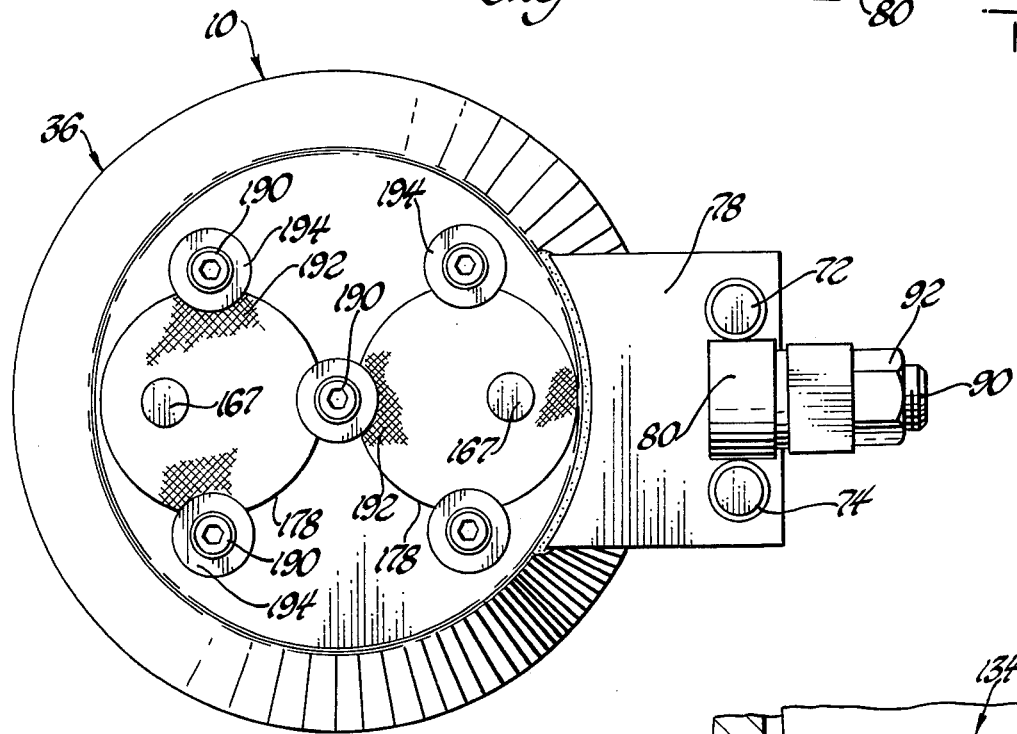
FIG. 5 is a plan view taken generally along line 5—5 of FIG. 4.

FIGS. 4 and 5 illustrate a tool head assembly 10 for imparting rotary rocking motion to one or more tool members which includes tool support means 36 for adjustably supporting a tool member such that the position of the tool member may be changed. For all practical purposes, the position of the tool members shown in the tool head assembly of FIG. 1 is relatively fixed once the passageway for locating the appropriate bushing member is drilled in the tool support portion 50. The location, number, and size of tool members mounted in the tool support means 36 are all determined in view of the workpiece which is intended to be particular upon. In other words, the tool head assembly 10 is specially designed for operating upon a particular workpiece. When there is a large volume of a partiicular workpiece to be operated upon, preparing a special tool head assembly 10 for each workpiece is justified. However, in some cases, it would be more desirable if the positions of the tool members could be changed so that the tool head assembly 10 is capable of operating upon two or more workpieces having differently located fasteners. For example, a common situation encountered is that one workpiece may include two fasteners which are spaced farther apart on the workpiece than those of a second workpiece. Normally, two tool head assemblies 10 would be employed, each having a pair of tool members with the tool members of one head being more closely spaced than those of the other. If the volume of the two types of workpieces is such that short, alternating runs of each type results, then it would be more economical to provide a single tool head assembly 10 which is capable of handling both types of workpieces. This would avoid the necessity of constantly changing the entire tool head assembly 10 and having one tool head assembly lying idle.

Accordingly, the tool head assembly 10, shown in FIGS. 4 and 5, includes two bushing members 178 which are rotatably supported by the tool support means 36 so as to be adjustable. Each of the bushing members 178 shown include a bore 180 extending therethrough for supporting a tool member 67. The bores 180 are displaced from the axis of rotation of their respective bushing member 178 so that rotation of the bushing member 178 moves the tool member in a circular path, as viewed in FIG. 5.

The bushing members 178 generally include a cylindrical body portion 182 which is adapted to be rotatably received in a passageway 184 in the tool support portion 50. As alluded to above, the bore 180 is adapted to axially, slidably receive a tool member 67. The bushing members 178 further include an annular flange porton 186 of greater diameter than the cylindrical body portion 182 which is adapted to be received in an annular recess 188 which surrounds the opening of the bore or passageway 184 extending through the tool support portion 50. The bushing members 178 are held in place by means of a plurality of threaded fasteners 190. Locking means is provided for selectively locking the bushing members 178 against rotation including a serrated outer surface on the bushing members 178 and serrated inner surface on the washer members 194 which are associated with the fastener members 190. After the bushing members 178 have been accurately positioned, the fastener members 190 are tightened, thereby bringing the mating serrated surfaces of the bushing members 178 and the washer members 194 into engagement to preclude further rotation of the bushing members 178. It is apparent that other means may be provided for locking the bushing members 178 in place.

In operation, by rotating one or both of the bushing members 178, various placements and spacing of the tool members can be achieved. Therefore, by paying close attention to the types of workpieces which are to be operated upon, the tool head assembly 10 can be designed to accept two or more workpieces having different fastener locations by making an easy adjustment. Of course, by reducing the size of the bushing members 178, more than two adjustable bushing members can be provided.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A tool head assembly comprising: a circular drive member adapted for attachment to a rotatably driven member for rotatable movement about an axis of rotation extending through said drive member, the central axis of said drive member being parallel to, but nonconcentric with respect to the axis of rotation; tool support means including means for axially slidably supporting a tool member; connecting means for connecting said tool support means to said drive member, said connecting means including a bearing set canted with respect to the axis of rotation such that the central axis of said tool support means is angularly offset from the axis of rotation; means for preventing rotation of said tool support means with said circular drive member; and thrust transmitting means carried by said rotatable circular drive member and in thrust transmitting relationship therewith for transmitting thrust to a tool member, the central axis of said thrust transmitting means being coincident with the axis of rotation.

2. An assembly as set forth in claim 1 wherein said thrust transmitting means is supported in a plane perpendicular with respect to the axis of rotation of said drive means.

3. An assembly as set forth in claim 1 wherein said tool support means includes at least one bushing member removably mounted therein and having at least one bore extending therethrough for axially, slidably supporting a tool member.

4. An assembly as set forth in claim 3 wherein said bushing member is threadedly mounted in said tool support means.

5. An assembly as set forth in claim 3 wherein said bushing member includes more than one bore extending therethrough for supporting a plurality of tool members.

6. An assembly as set forth in claim 5 wherein said bushing member includes threaded fasteners for mounting the same in said tool support means.

7. An assembly as set forth in claim 3 wherein said bushing member is rotatably supported in said tool support means and said bore is displaced from the axis of rotation of said bushing member.

8. An assembly as set forth in claim 7 wherein said tool support means includes means for selectively locking said bushing member against rotation.

9. An assembly as set forth in claim 1 wherein said tool support means comprises a cup member having an open end defining an internal annular surface, a substantially cylindrical side wall portion defining a cavity within said cup member, and a bottom wall portion.

10. An assembly as set forth in claim 9 wherein said bottom wall portion includes at least one passageway therethrough for receiving said bushing member.

11. An assembly as set forth in claim 9 wherein said thrust tranmitting means is disposed within said cup member and includes a thrust plate member and a thrust transmitting bearing disposed between said drive means and said thrust plate member.

12. An assembly as set forth in claim 11 wherein said thrust plate member is rotatably supported by said drive means such that said drive means may rotate relative to said thrust plate member.

13. An assembly as set forth in claim 12 wherein said thrust plate member includes a tool engaging portion, a thrust receiving portion, and a support portion.

14. An assembly as set forth in claim 13 wherein said tool engaging portion includes an annular plate member having a planar tool engaging surface.

15. An assembly as set forth in claim 14 wherein said thrust receiving portion includes a second annular plate member integral with said first annular plate member and having a thrust receiving surface, said second annular plate member being disposed on the side of said first annular plate member opposite to that of said tool engaging surface.

16. An assembly as set forth in claim 15 wherein said support portion includes a cylindrical support shaft and means for supportingly connecting said support shaft to said drive means.

17. An assembly as set forth in claim 16 wherein said means includes an annular groove disposed in said support shaft and a ring member disposed in said annular groove, the transverse dimension of said ring member being greater than the diameter of said support shaft.

18. An assembly as set forth in claim 17 wherein said thrust plate member includes a third annular plate member of smaller diameter than said second annular plate member and integral therewith for locating said thrust transmitting bearing and connecting said support shaft member to said second annular member.

19. An assembly as set forth in claim 18 wherein said drive means includes a bore for receiving said support shaft member and a bearing member within said bore for rotatably supporting said support shaft member.

20. An assembly as set forth in claim 1 wherein said drive member includes attachment means for attaching the same to the driven member, said attachment means including a threaded bore, the center of which is offset from the central axis of said drive member.

21. An assembly as set forth in claim 20 wherein said tool support means comprises a cup member having an open end defining an internal annular surface, a substantially cylindrical side wall portion defining a cavity within said cup member, and a bottom wall portion.

22. An assembly as set forth in claim 21 wherein said bottom wall portion includes at least one passageway therethrough for axially, slidably supporting a tool member.

23. An assembly as set forth in claim 22 wherein said bottom wall portion includes at least one bushing member removably mounted therein and having at least one bore extending therethrough for axially, slidably supporting a tool member.

24. An assembly as set forth in claim 23 wherein said thrust transmitting means includes a thrust plate member supported by said drive member and thrust transmitting bearing member disposed between said drive member and said thrust plate member such that said drive member may rotate freely relative to said thrust plate member.

25. An assembly as set forth in claim 24 wherein said means for preventing rotation of said tool support means includes two depending, spaced apart, parallel rod members supported by said tool support means and a roller member disposed between said rod members and in engagement therewith, said roller member being supported by a support member attached to a fixed member which is nonrotatable with respect to said drive means, the axis of said roller member being perependicular to the axis of rotation of said drive means.

26. An assembly as set forth in claim 25 wherein said roller member is rotable about an axis of rotation which intersects the point of intersection of the axis of rotation of said drive means and the central axis of the tool support means.

27. A tool head assembly adapted for attachment to the spindle of a machine press comprising: a circular drive member adapted for attachment to the rotating spindle of the machine press for rotatable movement about an axis of rotation which is parallel to, but laterally displaced from the central axis of said circular drive member, said circular drive member having a portion thereof through which the axis of rotation passes; a tool support member for axially slidably supporting a tool member; connecting means for connecting said tool support member to said drive member, said connecting means including a bearing set between said tool support member and said drive member which is canted with respect to the axis of rotation; means for preventing rotation of said tool support member with said drive member to cause rotary rocking motion of said drive member; a thrust plate carried by said circular drive member and which is in thrust transmitting relationship therewith for transmitting thrust to a tool member, the central axis of said thrust plate being coincident with the axis of rotation of the spindle; and means connecting said thrust plate to said drive member for permitting free rotation of said circular drive member.

28. An assembly as set forth in claim 27 wherein said thrust plate includes a thrust transmitting bearing disposed between said thrust plate and said drive member.

29. An assembly as set forth in claim 17 wherein said tool support member is generally cup-shaped and includes a bottom wall, a bore extending through said bottom wall, and a tool-supporting bushing removably held in said bore and extending outwardly from said bottom wall for axially slidably supporting a tool member.

30. A tool head assembly comprising: at least one tool member, drive means adapted for attachment to a rotatably driven member for rotatable movement therewith about an axis, tool support means for axially, slidably supporting said tool member, connecting means connecting said tool support means to said drive means on an axis at an angle to said first-named axis, means for preventing rotation of said tool support means with said drive means whereby rotation of said drive means imparts rotary rocking motion to said tool support means, and means for transmitting thrust through said tool member to a workpiece, said thrust transmitting means including a rounded head portion on said tool member, a cap member disposed on said rounded head portion and pivotal relative thereto having a bearing surface for engaging said rounded head portion and a planar surface.

31. An assembly as set forth in claim 30 wherein said cap member includes a hollow cylindrical body portion having an open end and a closed end wherein the interior side of said closed end defines said bearing surface and the exterior side defines said planar surface.

32. An assembly as set forth in claim 31 including retaining means for retaining said cap member on said tool member.

33. An assembly as set forth in claim 32 wherein the open end of said cap member includes a radially inwardly extending flange member.

34. An assembly as set forth in claim 33 including an annular groove on said tool member substantially adjacent said rounded head portion such that it is disposed within said cap member.

35. An assembly as set forth in claim 34 including a retaining member seated in said annular groove and having a dimension greater than the size of the opening in said cap member defined by said flange member.

36. An assembly as set forth in claim 35 wherein said bearing surface is conical.

37. An assembly as set forth in claim 30 wherein said tool member includes an axial bore, a replaceable working end member partially disposed within said bore, and means for removably retaining said working end member therein.

38. An assembly as set forth in claim 37 wherein said retaining means includes a permanent magnet.

39. A tool head assembly comprising: drive means adapted for attachment to a rotatably driven member for rotatable movement therewith about an axis, tool support means for axially, slidably supporting at least one tool member, connecting means connecting said tool support means to said drive means on an axis at an angle to said first-named axis, and means for preventing rotation of said tool support means with said drive means whereby rotation of said drive means imparts rotary rocking motion to said tool support means, said tool support means including a bushing member rotatably supported by said tool support means, a bore extending through said bushing member adapted to receive a tool member wherein the axis of said bore is displaced from the axis of rotation of said bushing member, and means for selectively locking said bushing member against rotation.

40. An assembly as set forth in claim 39 wherein said tool support means includes a cylindrical bore extending therethrough and an annular recess surrounding the entrance to said bore.

41. An assembly as set forth in claim 40 wherein said bushing member includes a cylindrical body portion adapted to be received in said cylindrical bore of said tool support means and an annular flange portion of greater diameter than said body portion adapted to be received in said annular recess.

42. An assembly as set forth in claim 41 wherein said tool support means includes fastener members for retaining said bushing member in said bore.

43. An assembly as set forth in claim 42 wherein said locking means includes mating serrated surfaces on said bushing member and said fastener members.

44. A tool head assembly comprising: a tool member, means for imparting rotary rocking motion to said tool member, and means for transmitting thrust through said tool member to a workpiece, said thrust transmitting means including a rounded head portion on said tool member, a cap member disposed on said rounded head portion and pivotal relative thereto having a bearing surface for engaging said rounded head portion and a planar surface.

45. An assembly as set forth in claim 44 wherein said cap member includes a hollow cylindrical body portion having an open end and a closed end wherein the interior side of said closed end defines said bearing surface and the exterior side defines said planar surface.

46. An assembly as set forth in claim 45 including retaining means for retaining said cap member on said tool member.

47. An assembly as set forth in claim 46 wherein the open end of said member includes a radially inwardly extending flange member.

48. An assembly as set forth in claim 47 wherein said tool member includes an annular groove substantially adjacent said rounded head portion such that it is disposed within said cap member.

49. An assembly as set forth in claim 48 including a retaining member seated in said annular groove and having dimension greater than the size of the opening in said cap member defined by said flange member.

50. An assembly as set forth in claim 49 wherein said bearing surface is conical.

51. An assembly as set forth in claim 49 wherein said retaining member comprises a resilient O-ring member.

52. An assembly as set forth in claim 44 wherein said tool member includes an axial bore, a replaceable working end member partially disposed within said bore, and means for removably retaining said working end member therein.

53. An assembly as set forth in claim 52 wherein said retaining means includes a permanent magnet.

54. A tool head assembly comprising; tool support means, at least one tool member supported by said tool support means for imparting rotary rocking motion to said tool member, and means for transmitting thrust to said tool member; said tool support means including a bushing member rotatably supported by said tool support means, a bore extending through said bushing member adapted to receive said tool member wherein the axis of said bore is displaced from the axis of rotation of said bushing member, and means for selectively locking said bushing member against rotation.

55. An assembly as set forth in claim 54 wherein said tool support means includes a cylindrical bore extending therethrough and an annular recess surrounding the entrance to said bore.

56. An assembly as set forth in claim 55 wherein said bushing member includes a cylindrical body portion adapted to be received in the cylindrical bore of said tool support means and an annular flange portion of greater diameter than said body portion adapted to be received in said annular recess.

57. An assembly as set forth in claim 56 wherein said tool support means includes fastener members for retaining said bushing member in said bore.

58. An assembly as set forth in claim 57 wherein said locking means includes mating serrated surfaces on said bushing member and said fastening members.

* * * * *

UNITED STATES PATENT OFFICE
CERTIFICATE OF CORRECTION

PATENT NO. : 3,899,909
DATED : August 19, 1975
INVENTOR(S) : Vladimir Taruntaev

It is certified that error appears in the above-identified patent and that said Letters Patent are hereby corrected as shown below:

Column 5, line 64 "withwith" should be --therewith--. Column 6, line 16 "an" should be --the--. Column 7, line 34 "meand" should be --means--. Column 9, line 42 "143" should be --134--; column 9, line 60 "14" should be --164--. Column 10, line 10 "particular" should be --operated--; column 10, lines 12 and 13 "partiicular" should be --particular--. Column 11, line 2 "spacing" should be --spacings--. Column 12, line 11 cancel "said" and insert therefor --a tool-carrying--. Column 13, lines 21 and 22 "perependicular" should be --perpendicular; column 13, line 55 delete "17" and insert therefor --27--.

Signed and Sealed this seventeenth Day of February 1976

[SEAL]

Attest:

RUTH C. MASON
Attesting Officer

C. MARSHALL DANN
Commissioner of Patents and Trademarks